(12) United States Patent
Schleiffarth (10) Patent No.: US 11,649,174 B2
(45) Date of Patent: May 16, 2023

(54) CONCENTRATOR AND CRYSTALLIZER EVAPORATION SYSTEM

(71) Applicant: James W. Schleiffarth, Midway, UT (US)

(72) Inventor: James W. Schleiffarth, Midway, UT (US)

( * ) Notice: Subject to any disclaimer, the term of this patent is extended or adjusted under 35 U.S.C. 154(b) by 821 days.

(21) Appl. No.: 14/732,512

(22) Filed: Jun. 5, 2015

(65) Prior Publication Data

US 2015/0360971 A1     Dec. 17, 2015

Related U.S. Application Data

(60) Provisional application No. 62/013,398, filed on Jun. 17, 2014.

(51) Int. Cl.
*C02F 1/04* (2023.01)
*B01D 3/00* (2006.01)
(Continued)

(52) U.S. Cl.
CPC .............. *C02F 1/048* (2013.01); *B01D 1/221* (2013.01); *B01D 1/2856* (2013.01); *B01D 3/10* (2013.01);
(Continued)

(58) Field of Classification Search
CPC .... C02F 1/048; C02F 1/041; C02F 2101/101; C02F 2101/20; C02F 2103/18;
(Continued)

(56) References Cited

U.S. PATENT DOCUMENTS 2,214,658 A * 9/1940 Browning ............. F22B 37/322
122/491
3,522,997 A * 8/1970 Rylewski ............ F04D 29/2277
415/72

(Continued)

FOREIGN PATENT DOCUMENTS

CN         1682034 A      10/2005
CN       201589565 U       9/2010
(Continued)

OTHER PUBLICATIONS

WCR. "This Is a Plate Heat Exchanger." Plate Heat Exchangers, Jan. 28, 2013, www.wcr.se/plateheatexchangers.html.*

(Continued)

*Primary Examiner* — Dirk R Bass
(74) *Attorney, Agent, or Firm* — Thorpe North & Western, LLP; David W. Osborne (57) ABSTRACT

An aqueous stream cleaning system including a circulation pump to receive a waste fluid and/or a concentrated liquid bottoms stream, and expel a circulation stream. The aqueous stream cleaning system can also include a primary heat exchanger to receive the circulation stream from the circulation pump. The primary heat exchanger can have a plurality of heat exchange plates that define an internal surface area for heat transfer from a distillate stream to the circulation stream to produce a cooled distillate stream and a heated circulation stream. The plurality of heat exchange plates can be spaced to facilitate free flow of solids in the circulation stream between the plurality of heat exchange plates. A mass flow rate and pressure of the circulation stream can be configured to minimize build-up of solids in the primary heat exchanger. The aqueous stream cleaning system can further include an evaporation unit to receive the heated circulation stream from the primary heat exchanger. The distillate stream is formed when steam in the heated circulation stream evaporates in the evaporation unit, and the concentrated liquid bottoms stream is formed from a portion of the heated circulation stream that does not evaporate.

20 Claims, 6 Drawing Sheets

(51) Int. Cl.
   *B01D 5/00* (2006.01)
   *B01D 1/22* (2006.01)
   *B01D 1/28* (2006.01)
   *B01D 3/10* (2006.01)
   *C02F 103/18* (2006.01)
   *C02F 101/10* (2006.01)
   *C02F 101/20* (2006.01)

(52) U.S. Cl.
   CPC ........... *B01D 5/006* (2013.01); *B01D 5/0015* (2013.01); *C02F 1/041* (2013.01); *C02F 2101/101* (2013.01); *C02F 2101/20* (2013.01); *C02F 2103/18* (2013.01)

(58) Field of Classification Search
   CPC ................ B01D 1/2856; B01D 5/0015; B01D 19/0057; B01D 1/221; B01D 1/28; B01D 3/10; B01D 5/006; F28D 9/00; F28D 9/005; F28D 9/0006; F28D 9/0025; F28D 9/0031; F28D 9/0037; F28D 9/0062; F28D 9/0081; F28D 1/0308; F28F 3/005; F28F 3/08; F28F 3/086
   USPC ........................................ 165/164–167, 170
   See application file for complete search history.

(56) References Cited

U.S. PATENT DOCUMENTS

| | | | | |
|---|---|---|---|---|
| 3,574,066 | A * | 4/1971 | Kijima | C02F 1/04 202/173 |
| 6,365,005 | B1 * | 4/2002 | Schleiffarth | B01D 3/42 203/1 |
| 6,517,309 | B1 * | 2/2003 | Zaher | F04D 29/669 415/1 |
| 7,175,388 | B2 * | 2/2007 | Labbe | F01D 11/003 415/174.5 |
| 7,318,849 | B2 * | 1/2008 | Betting | B01D 5/0021 55/396 |
| 7,837,768 | B2 * | 11/2010 | Sanderson | B01D 1/16 165/108 |
| 7,842,121 | B2 | 11/2010 | Sanderson et al. | |
| 2009/0082906 | A1 * | 3/2009 | Sanderson | B01D 1/16 700/271 |

FOREIGN PATENT DOCUMENTS

| | | | | |
|---|---|---|---|---|
| CN | 102465912 | A | 5/2012 | |
| CN | 202983239 | U | 6/2013 | |
| CN | 103203116 | A | 7/2013 | |
| JP | 5390478 | B2 * | 1/2014 | ............. F01C 19/00 |
| WO | WO 2011/138010 | A2 | 2/2011 | |
| WO | WO-2011138010 | A2 * | 11/2011 | ................ E03F 3/04 |

OTHER PUBLICATIONS

Armstrong. "Plate Heat Exchangers." Armstrong Integrated Limited, 2010, file:///C:/Users/bobenhuber/Documents/Applications,%20Current/14732512/Armstrong%20(PHE%20Brochure).pdf.*

Lamb, Brian. "Plate and Frame Heat Exchangers." Thermopedia™, Jun. 9, 2013, www.thermopedia.com/content/1035/.*

Sondex. "Free Flow Plate Heat Exchangers." Sondex A/S—Head Office, 2007, www.sondex.net/Files/Billeder/PDF/FREE%20FLOW%202007.pdf.*

Lamb, "Plate and Frame Heat Exchangers," Feb. 7, 2011, accessed on the Internet at http://dx.doi.org/10.1615/AtoZ.p.plate_and_frame_heat_exchangers on Dec. 17, 2020, 13 pages. (Year: 2011).*

International Search Report dated Nov. 4, 2015; in PCT/US15/34556; filed Jun. 5, 2015; 10 pages.

* cited by examiner

CONCENTRATOR AND CRYSTALLIZER EVAPORATION SYSTEM

PRIORITY CLAIM

This application claims priority to U.S. Provisional Patent Application Ser. No. 62/013,398 filed on Jun. 17, 2014 entitled "Aqueous Stream Cleaning Systems and Methods" which is incorporated herein by reference in its entirety.

FIELD OF THE INVENTION

The present invention relates generally to waste stream cleaning devices, systems, and associated methods and more particularly to improved systems for concentrating, crystallizing, and removing contaminants from an aqueous waste stream.

BACKGROUND

Waste water is often a byproduct of many different types of industrial operations. Various sectors from manufacturing and power generation to mining and drilling often use water in their various activities. For example, in power generation water is used for scrubbing stack gas air discharges in a process called Flue Gas Desulfurization. Sulfur compounds, heavy metals and other contaminants are removed in the scrubbing process. Due to environmental concerns, new regulations are being promulgated ensuring that resulting contaminated scrubber water cannot simply be dumped into lagoons or discharged into a receiving steam. The requirement to treat contaminated scrubber water presents an additional operation and expense for electric generating power plant operators. Treating waste water typically involves one or more unit operations, such as chemical precipitation, precipitate and solids filtration and dissolved salts membrane filtration in a treatment train. Conventional waste water treatment systems operated in series, however, are inefficient for a variety of different reasons. It is therefore recognized that improved devices and systems used in the waste water treatment industry operated in a simplified and reduced unit operation manner are desirable.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth.

It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of the term "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

Example Embodiments

An initial overview of technology embodiments is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the current technology operate to increase the circulation rate of mass flow through an evaporation unit in an effort to create a highly concentrated or "crystallized" waste product and a "purified" or dischargeable effluent or distillate. Crystalized product or "crystallization" as used herein means a feed stream that is concentrated past the saturation point to where the salts (or other impurities) re-precipitate out of solution. In some embodiments, the distillate stream (sometimes referred to as effluent) can have up to 80 to 100 percent water by volume after the crystallized product is removed from the waste stream. The significant increase in the concentration of the solids, however, creates numerous other problems with the operation of known treatment systems. Improvements to the numerous components associated with the system and their methods of operation are described herein to permit efficient crystallization of the concentrated waste product.

Figure 1:
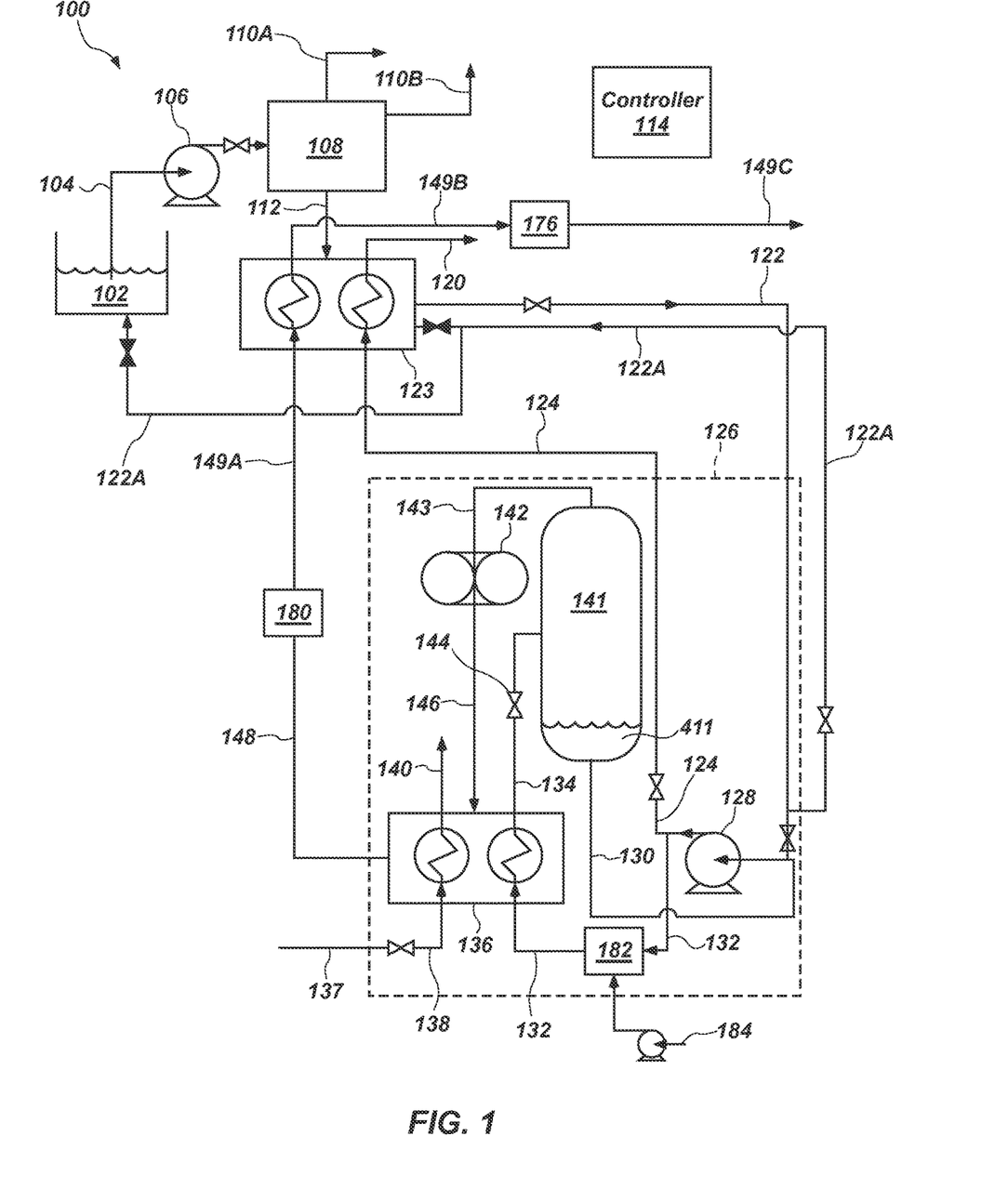
FIG. 1 is a schematic block diagram illustrating one embodiment of a system for purifying a waste stream in accordance with the present disclosure.

Aspects of the current invention relate to an aqueous stream purification system, and associated devices and methods. FIG. 1 is a schematic block diagram illustrating one aspect of a system 100 for purifying a waste fluid stream. The system 100 includes a feed tank 102 holding the waste fluid (e.g. waste water from an industrial process) to be treated, although any other supply of waste fluid may be used. The waste fluid enters as a waste fluid stream 104 and, in some examples, can be supplied by a feed pump 106 to a water-oil separator 108. The waste fluid stream 104 may be from any industrial process, and/or naturally occurring water source.

When included in the system 100, the separator 108 may be a coalescing separator or any other separation mechanism to separate bulk oil from water, for example including a settling tank. The separator 108 may further perform liquid-solid separation, for example separating large solids such as grindings from metalworking or non-dissolved limestone solids from power plant scrubbers. The separator 108 may include a wedge-wire self-cleaning pre-screen, a rotary screen filter, or other separation mechanisms known in the art to perform the liquid-solid separation. The separated solids may leave the separator 108 as a solids waste stream 110A. Bulk oil (which may be any hydrocarbon or other low-density liquid immiscible in water) or other non-dissolved solids, leaves the separator 108 as a liquid waste stream 110B and bulk water leaves the separator 108 as a feed stream 112. After the separator 108, the feed stream 112 comprises water with impurities, which may include traces of volatile organics, and/or any other soluble or miscible fluids and/or solids. The type and amount of impurities depend on the specific separator device or mechanisms employed. Examples of impurities may also include sulfate/sulfite salts and/or nitrate/nitrite salts. It should be recognized that the pretreatments disclosed herein are merely examples and that other pretreatments can be used depending on the fluid stream being cleaned, etc.

The system 100 may include a controller 114 that controls various temperatures, pressures, flow rates, fluid levels, and/or other system operating attributes that will become clear in various embodiments described herein. The controller 114 may be in communication with various sensors and actuators (not shown) depending upon the controls in a specific embodiment. The sensors may include pressures, temperatures, fluid levels, flow rates, densities, and/or other parameters of any stream or vessel. The actuators may include electronic, hydraulic, and/or pneumatic manipulation of any valves, pumps, blowers, and/or other physical components of the system 100. The controller 114 may be electronic (e.g. a computer with an electronic interface), mechanical (e.g. springs or the like to respond to various system parameters in prescribed ways), and/or may include a manual aspect (e.g. a sight gauge and a hand valve wherein an operator controls a tank level).

The feed stream 112 may be directed to a secondary recovery heat exchanger 123, which may be a plate and frame heat exchanger, a shell-and-tube heat exchanger, or any other suitable type of heat exchanger known in the art. The secondary recovery heat exchanger 123 transfers heat from one or more exiting streams that may have residual heat from the separation process of the system 100 to the feed stream 112 to create a pre-heated feed stream 122. The pre-heated feed stream 122 enters a separation unit 126 that removes impurities from the pre-heated feed stream 122. In general, the separation unit 126 receives waste fluid for cleaning Thus, the feed stream 112 and/or the pre-heated feed stream 122 may be broadly referred to as waste fluid, in that the feed stream 112 and the pre-heated feed stream 122 are continuations of the waste fluid stream 104 to the separation unit 126.

In one aspect of the technology, a pre-treatment recirculation is included in the system 100. The recirculation loop 122A is in fluid communication with the feed pump 106 and the pre-heated feed stream 122. The recirculation loop 122A has an inlet prior to the circulation pump 128 and an outlet at the source feed stream 112. The secondary recovery heat exchanger 123 coupled to the feed stream 112 pre-heats the feed stream 112 but can become fouled due to impurities within the waste stream itself in the event the mass flow through the pre-heated feed stream 122 is stagnant as fluids are circulated through the separation unit 126. The recirculation loop 122A minimizes fouling by recirculating fluids within the pre-heated feed stream 122 until a volume of waste fluid is ready to be introduced into the separation unit 126. In accordance with one aspect of the technology, a ratio of the mass flow rate of a recirculation stream within the recirculation loop 122A to the mass flow rate of the waste stream received by the circulation pump 128 for introduction into separation unit 126 is greater than about 4. In another aspect, the ratio of the mass flow rate of a recirculation stream within the recirculation loop 122A to the mass flow rate of the waste stream received by the circulation pump 128 ranges from about 4 to 6. In one aspect, the recirculation loop 122A feeds directly into the feed tank 102. However, in other aspects, the recirculation loop 122A feeds directly into the feed stream 112 in fluid communication with the secondary heat exchanger 123.

In one embodiment, the separation unit 126 is a mechanical vapor recompression unit. In the separation unit 126, the pre-heated feed stream 122 may be mixed with a concentrated bottoms stream 130, and fed through a circulation pump 128. The circulation pump 128 outlet may be split into a pre-recovery concentrated purge stream 124 and a circulation stream 132. The pre-recovery concentrated purge stream 124 passes through the secondary recovery heat exchanger 123 and transfers residual heat to the feed stream 112 before exiting as a concentrated purge stream 120.

Figure 4:
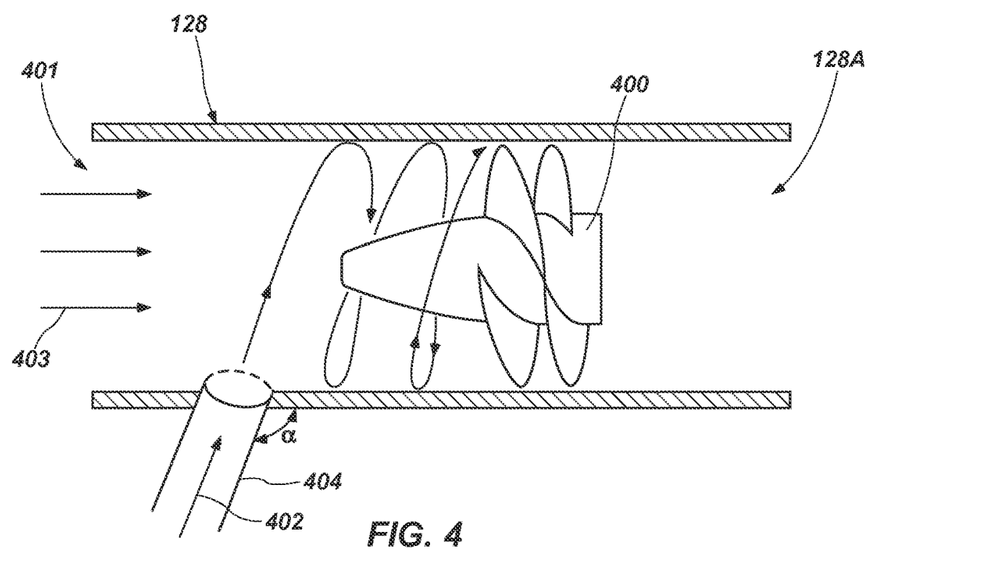
FIG. 4 is a side view of inlet piping of a circulation pump in accordance with the present disclosure.

With reference to FIG. 4, in accordance with one aspect of the technology, an inducer 400 is disposed into the inlet piping 128A of the circulation pump 128. The inducer 400 creates a rotational flow of the waste fluid 401 prior to being received by the circulation pump 128 thereby decreasing the possibility of cavitation within the pump 128. In another aspect, waste fluid 402 is introduced into the inlet piping 128A of the circulation pump 128 tangentially to the direction of flow 403 in the inlet piping 128A. In one aspect, the waste fluid inlet 404 is disposed at an angle α with respect to the inlet piping 128A. This also creates a rotational flow helping reduce the possibility of cavitation within the circulation pump 128. In one aspect, the circulation pump 128 operates at between about 750 to about 1000 rotations per minute and is sized such that the net positive suction head of the pump 128 is about the same as the height 410 of the concentrated bottoms 411 present in the evaporation unit 141.

In one embodiment, the secondary recovery heat exchanger 123 heats the feed stream 112 after the separator 108 removes the solids waste stream 110A from the waste fluid stream 104, but before the separator 108 removes the liquid waste stream 110B from the waste fluid stream 104. The heating of the waste fluid stream 104 after solids 110A removal allows the secondary recovery heat exchanger 123 to avoid unnecessarily heating waste solids 110A, while providing some heat to assist in quickly separating the liquid waste stream 110B. In one embodiment, the separator 108 includes multiple stages and components to perform solid waste 110A removal in one or more stages, and to perform liquid waste 110B removal in one or more stages. The secondary recovery heat exchanger 123 is shown downstream of the separator 108, but may be upstream of the separator 108 and/or distributed between stages of the separator 108.

The separation unit 126 includes an evaporation unit 141 that provides the concentrated bottoms stream 130 to the circulation pump 128. The evaporation unit 141 accepts a heated circulation stream 134 that may be heated in a primary heat exchanger 136 by a steam inlet stream 138 tapped from a system steam inlet 137. For the purposes of a clear description, the heat inlet stream 137 is referred to as a system steam inlet 137, but the heat inlet stream 137 and related streams (e.g. 138, 140, 158) may comprise any heat inlet medium including heated glycol, heated oil, and/or other heat transfer media configured to deliver thermal energy from a heat source (not shown) to the heat exchangers 136, 158. The steam inlet stream 138 may leave the primary heat exchanger 136 as a cooled steam outlet 140. The circulation stream 132 may further accept heat from a distillate stream 143 out of the evaporation unit 141 that is taken from the evaporation unit 141 by a compressor or blower 142 and passed through the primary heat exchanger 136. In one aspect of the technology, the evaporation 141 unit is operated from a negative pressure (i.e. a vacuum) to about 15 psig.

The primary heat exchanger 136 may be a shell-and-tube heat exchanger with the circulation stream 132 passing on the tube-side. Preferably, the circulation stream 132 passes through the primary heat exchanger 136 in highly turbulent flow, increasing the heat transfer rate and reducing the amount of fouling in the primary heat exchanger 136. Alternatively, the primary heat exchanger 136 may be a plate and frame heat exchanger, a spiral exchanger, or another heat exchanging device known in the art.

In one embodiment, the primary heat exchanger 136 is configured to transfer the heat of vaporization from a pressurized distillate stream 146 to the circulation stream 132, and also heat from a steam inlet stream 138 to the circulation stream 132. The heat transfer may be staged such as first transferring the heat of vaporization from the pressurized distillate stream 146, then transferring the heat from the steam inlet stream 138. In one embodiment, the pressurized distillate stream 146 exits the primary heat exchanger 136 as a cooled distillate stream 148 at a temperature just below the boiling point of the cooled distillate stream 148. The primary heat exchanger 136 may be designed to deliver the cooled distillate stream 148 at a specified temperature and/or at a specified pressure, and one of skill in the art recognizes the selection of the specified temperature and/or specified pressure affects the final pressure and/or temperature of the cooled distillate stream 148.

Figure 5:
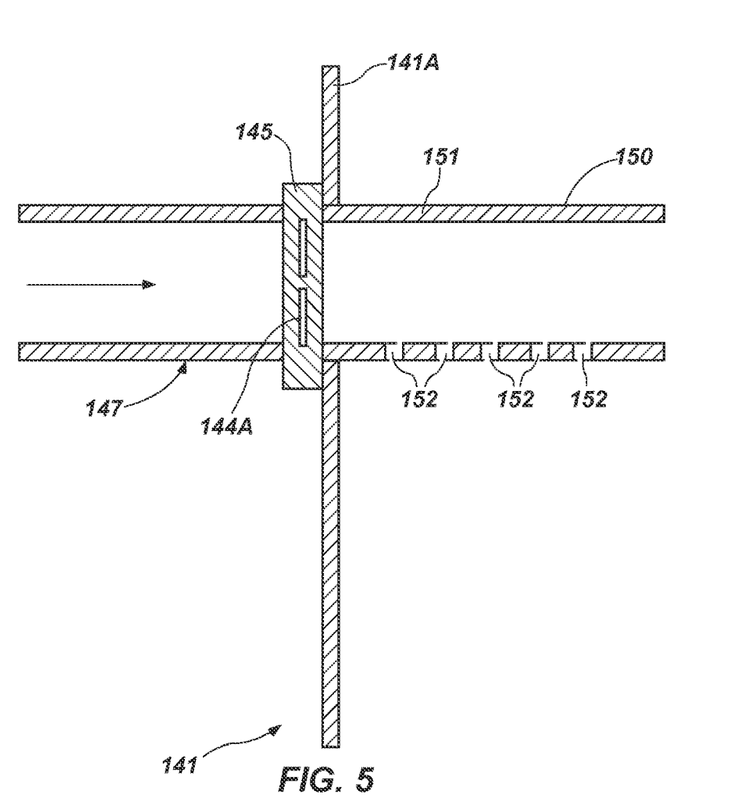
FIG. 5 is a side view of an inlet to an evaporation unit in accordance with the present disclosure.

With reference generally to FIG. 1 and more specifically to FIG. 5, the heated circulation stream 134 may pass into the evaporation unit 141 such that the heated circulation stream 134 flashes into the evaporation unit 141. In one aspect, the heated circulation stream 134 enters the evaporation unit 141 via an orifice 144 near the evaporation unit 141 inlet piping 147. The orifice 144 can be configured to enhance the flash effect of the heated circulation stream 134. The orifice 144 may be further configured to maintain backpressure on the primary heat exchanger 136 such that vapor bubbles do not form in the primary heat exchanger 136, helping to prevent cavitation, wear, and fouling of the heat exchanger 136, such as due to scaling. In one embodiment, the orifice 144 may be a valve controlled by the controller 114, and/or set manually, to provide a designed and/or controlled back pressure on the heated circulation stream 134. In another embodiment, an inlet pipe 147 can comprise the orifice 144 by having a suitable inner diameter.

In accordance with one aspect, the orifice 144 comprises an orifice valve 144A removably disposed within a flange 145 placed about an exterior surface of the evaporation unit 141. The orifice valve 144A comprises a flat plate having an aperture disposed in the middle of the plate limiting the flow of waste fluid into the evaporation unit 141 thereby increasing the pressure of the fluid just prior to its introduction into the evaporation unit 141. An elongate hollow member 150 having a solid top surface 151 is in fluid communication with the orifice valve 144A and extends into the evaporation unit 141. A plurality of apertures 152 are disposed about a bottom of the hollow elongate member 150 to accommodate gravity removal of concentrated waste material into the collection of concentrated bottoms 411. In one aspect of the technology, the apertures 152 are evenly spaced apart from one another about the bottom of the hollow elongate member 150.

The evaporation unit 141 accepts the flashed heated circulation stream 134, and has a concentrated liquid bottoms 411 to supply the concentrated bottoms stream 130, and a distillate stream 143. The distillate stream 143 will be largely water, and will further include any components of the feed stream 112 that have a volatility near or greater than water. In one aspect, the evaporation unit 141 can be configured as a centrifugal separator, such as a hydrocyclone. In another aspect, the evaporation unit 141 can be configured as a vessel with an integral flash spray system in a variety of forms, such as a spray header or centralized nozzle. In one aspect, the diameter in inches of the evaporation unit 141 is calculated from the rising velocity of the steam.

Figure 6:
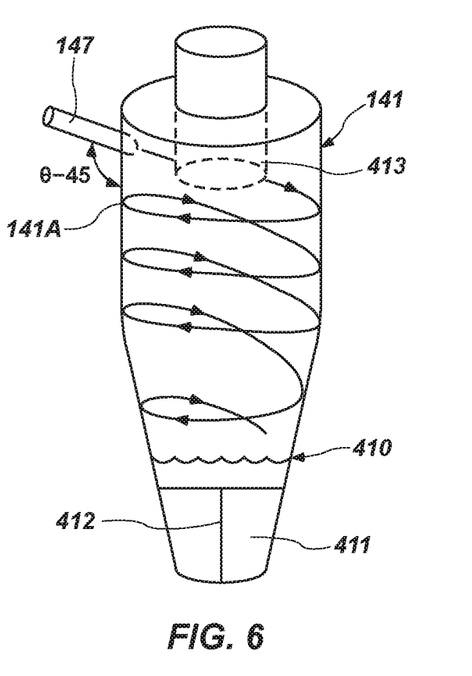
FIG. 6 is a side view of an evaporation unit in accordance with the present disclosure.

With reference now to FIG. 6, in one aspect, the evaporation unit 141 has a generally cylindrical or conical shape with a waste stream inlet 147 disposed tangentially about the periphery of the evaporation unit 141 and directed substantially perpendicular to a longitudinal axis of the evaporation unit 141 angled downward at angle θ-45 degrees with respect to a sidewall 141A of the evaporation unit 141. In this manner, waste material that is not evaporated is directed about the interior wall of the evaporation unit 141 in a downward fashion to increase vessel wall velocities and improve steam separation from the waste material within the unit 141 itself. A vortex breaker 412 is disposed about the evaporation unit 141 proximate to a top level 410 of the accumulated concentrated bottoms 411. The vortex breaker 412 operates to minimize the entrainment of air into the concentrated bottoms stream 130 which affects the efficiency and Net Positive Suction Head (NPSH) of the circulation system. In one aspect, an adjustable height vortex finder 413 is disposed about the top of the evaporation unit 141.

A blower 142 may draw and compress the vapors off of the evaporation unit 141, and send the pressurized distillate stream 146 through the primary heat exchanger 136. The pressurized distillate stream 146 leaves the primary heat exchanger 136 as a cooled distillate stream 148. In one aspect, the blower 142 moves the vapor from the evaporation unit 141 through the primary heat exchanger 136. In one example, the blower 142 operates at about 1-15 psig on the suction side (i.e. the distillate stream 143) and about 7-25 psig on the discharge side (i.e. the pressurized distillate stream 146). The distillate stream 143 may be de-superheated (i.e. cooled to the dew point but still steam) by water spray injection (not shown) just before the blower 142, or at any other logical location within the system 100 including after the blower 142. The de-superheating may be performed by cooling water (not shown), by heat exchange with the feed stream 112, the pre-recovery concentrated purge stream 124, and/or another stream in the system 100. The pressurized distillate stream 146 enters the primary heat exchanger 136 at approximately the temperature of the dew point of the pressurized distillate stream 146. The cooled distillate stream 148 exits the primary heat exchanger 136 at a temperature offset above the circulation stream 132 temperature, for example about 2-3 degrees F. above the circulation stream 132 temperature and/or just at or below the boiling point of the cooled distillate stream 148. In one embodiment, the blower 142 is a disc flow turbine (i.e. a "Tesla turbine") run as a pump, with work flowing from the shaft to the distillate stream 143.

Figure 7:
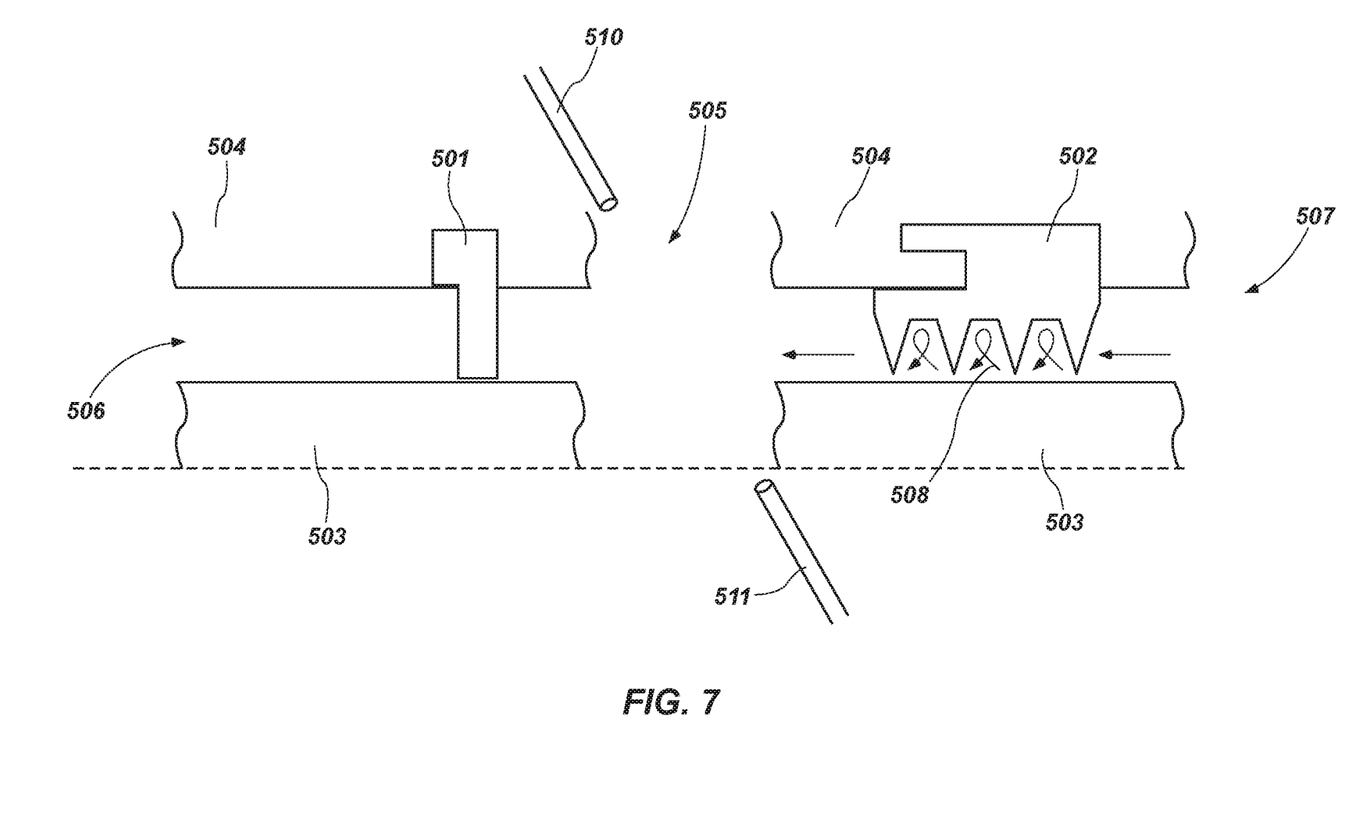
FIG. 7 is a side view of a portion of a blower in accordance with the present disclosure.

With reference now to FIG. 7, in one aspect, the blower 142 comprises a plurality of seals 501, 502 defining an area 505 between an oil chamber 506 and a steam chamber 507. The seals 501, 502 operate in connection with the shaft 503 and stator 504 to remove evaporated vapors from the evaporation unit 141 and create the pressurized distillate stream 146 as discussed above. In certain aspects, a labyrinth seal is employed with the steam chamber 507, though other seals are contemplated for use herein. Certain amounts of steam 508 leak through the seal 502 into the area 505 between the oil chamber 506 and steam chamber 507 leading to corrosion and/or other operational problems. In one aspect, a volume of pressurized fluid, such as air, is propagated into the area 505 between the oil chamber 506 and the steam chamber 507. The pressure of the fluid may range between 5 and 15 pounds per square inch, for example, but other pressures are contemplated herein so long as it exceeds the pressure within the steam chamber 507. In accordance with one aspect of the technology, a fluid inlet 510 is disposed above and in fluid communication with the area 505 between the oil chamber 506 and the steam chamber 507. In one aspect, a fluid outlet 511 is disposed within the area 505 between the oil chamber 506 and the steam chamber 507 to communicate any steam 508 that may leak from the seal 502 away from the area 505. In yet another aspect, the oil chamber 506 is defined by two seals. In addition, the oil chamber 506 has a one-way pressure relief valve disposed between the two seals.

In one embodiment, the system 100 includes a steam control unit 180. The steam control unit 180 provides backpressure to keep the cooled distillate stream 148 in a liquid phase and to provide condensed steam 149A to the secondary recovery heat exchanger 123. The steam control unit 180 may comprise a steam trap or other steam control devices. The steam control unit 180 may further comprise a pump that delivers the condensed steam 149A to the secondary recovery heat exchanger 123 to return remaining heat from the distillate stream 143 to the feed stream 112. In one embodiment, the cooled distillate stream 148 may utilize a separate heat exchanger (not shown) from the heat exchanger 123 utilized by the pre-recovery concentrated purge stream 124. A post-secondary heat recovery stream 149B may be passed through a final processing unit 176, for example a carbon adsorber, before discharged as a purified product stream 149C. The cooled distillate stream 148 may pass through the secondary recovery heat exchanger 123 and/or the final processing unit 176 in any order, and some or all of these components may be present in a given embodiment of the present invention.

Figure 3:
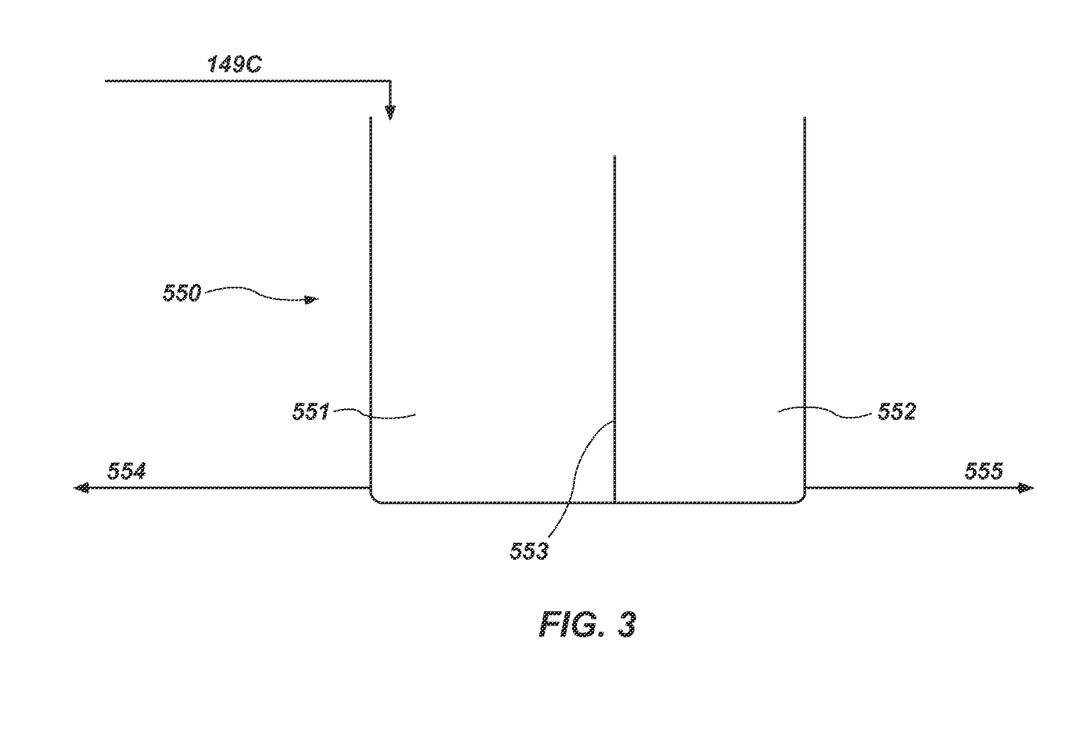
FIG. 3 is a side view of a storage device in accordance with an example of the present disclosure.

With reference to FIG. 3, in accordance with one aspect of the technology, the purified product stream 149C (i.e. the clean system effluent) is discharged into a storage device 550. Storage device 550 comprises a first compartment 551 and a second compartment 552 separated by a weir 553 or other separation device. Purified water is stored in the first compartment 551 for use in connection with operation of system 100. For example, purified water stored in the first compartment 551 may be used in connection with the de-superheated or liquid quench process or as a source for steam 137 and, in one aspect, is removed from the first compartment 551 through stream 554. The first compartment 551 may also be a storage location for material emanating from fluid outlet 511. Water accumulated in the first compartment 551 flows over weir 553 into the second compartment 552 and later through stream 555 for disposal.

Figure 2:
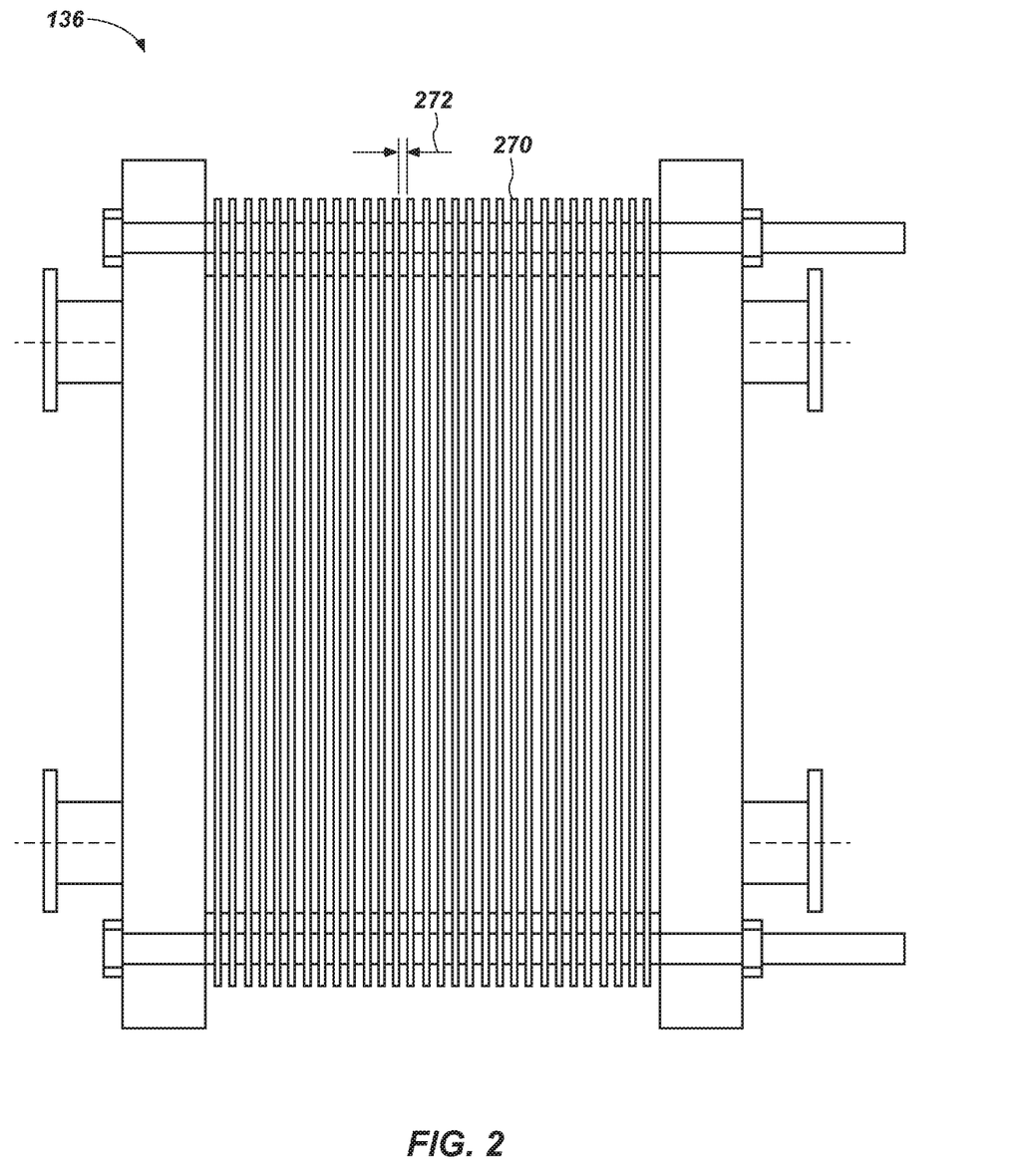
FIG. 2 illustrates certain aspects of a primary heat exchanger in accordance with an example of the present disclosure.

With reference to FIG. 2, and continued reference to FIG. 1, certain aspects of the primary heat exchanger 136 are illustrated, in accordance with one example of the present disclosure. In this example, the primary heat exchanger 136 is configured as a plate and frame heat exchanger, having a plurality heat exchange plates 270 separated from one another by a spacing or gap 272. In one aspect, the spacing or gap 272 between the heat exchange plates 270 is wide compared to typical plate and frame heat exchangers. For example, the spacing or gap 272 can be between about 4.5 mm to about 12 mm, depending on the application. In another aspect, the primary heat exchanger 136 can be configured with no touch points on the inlet and/or outlet ports for solids (i.e. salts) to collect. The thickness of the heat exchange plates 270 can be configured to structurally support the heat exchange plates 270 without the need for touch points at the ports, between adjacent plates, or other structural supports for the plates 270. Advantageously, as solids within the waste stream are crystallized, the spacing and design of the exchange plates 270 minimizes fouling from the presence of particulates not present in other waste treatment systems, particularly when used in connection with a "crystallized" waste product as described herein.

In one aspect, the thickness of the plates 270 range from about 0.7 to 1.0 mm with a preferred thickness range from about 0.8 to 0.9 mm. In one aspect, the primary heat exchanger 136 is divided into two sections to transfer heat to the circulation stream 132—a first heat donating section in fluid communication with the pressurized distillate stream 146 and a second heat donating section in fluid communication with stream 137. In one aspect, the first section comprises about 90 to 75 percent of the total heat donating surface area to transfer heat to the circulation stream 132 and the second section comprises about 10 to 25 percent of the total heat donating surface area to transfer heat to the circulation stream 132. In a preferred embodiment, the first section comprises about 75 to 85 percent of the total heat donating surface area to transfer heat to the circulation stream 132 and the second section comprises about 15 to 25 percent of the total heat donating surface area to transfer heat to the circulation stream 132. In yet another aspect, the heat exchange plates 270 can be flat or smooth, unlike typical heat exchange plates that have patterned ridges and/or recesses in the plates. Alternatively, the heat exchange plates 270 can include patterned ridges and/or recesses that are relatively shallow compared to typical ridges and recesses. The result of the wide gaps 272, lack of touch points, and minimal or no ridges and/or recesses in the plates 270 is a non-fouling "free flow" primary heat exchanger configuration.

With the heat exchanger 136 having a free flow configuration, heat transfer can be enhanced by high flow rates of the circulation stream 132. Circulation ratios can be much higher than in other mechanical vapor recompression circulation systems. The circulation ratio is defined as the mass flow of circulation stream 132 divided by the mass flow of the distillate stream 143. For example, the use of the free flow primary heat exchanger 136 and other aspects of the present invention can allow recycle ratios of 200-400 or greater (i.e. mass flow of circulation stream 132 is at least 200-400 times the mass flow of the distillate stream 143), with 300-350 being typical. Circulation rates (i.e. recycle ratios) above 300× economically improve the heat transfer in the primary heat exchanger 136 and can result in a significantly higher concentrated waste stream resulting in crystallization of the solids found therein. In one aspect of the technology, the recirculation ration ranges from 200 to 300 times the mass flow rate of the distillate stream 143, 300 to 400 times the mass flow rate of the distillate stream 143, or 400 to 500 times the mass flow rate of the distillate stream 143.

In other words, the additional pumping losses incurred by increasing the flow rate are lower than the additional capital costs required to purchase a larger primary heat exchanger. And, the increased concentration of the eventual discharge product results in a smaller amount of waste product that requires disposal. At these high circulation rates, however, erosion of the heat transfer plates 270 can occur. Thus, in one embodiment, the velocity of fluid through the inlet port of the primary heat exchanger 136 can be limited to 26 feet per second to avoid or minimize erosion. At a fluid velocity under 18 feet per second, the system efficiency can drop off and solids can settle in the primary heat exchanger 136. In a preferred embodiment, a suitable fluid velocity is less than about 20 feet per second.

The flows, temperatures, pressures, and other parameters of the various streams in the system 100 vary according to the application and may be controlled by the controller 114. In one example, the waste fluid stream 104 flows between 2 and 70 gallons per minute (gpm), and is limited primarily by the capacity of the evaporation unit(s) 141. The purified product stream 149C flow rate depends upon the required final purity of the stream 149C and the concentration of impurities in the waste fluid stream 104, but will typically be a flow rate of about 90% of the waste fluid stream 104. The concentrated purge stream 120 will be the remainder of the waste fluid stream 104, less the volatile fraction stream and the non-condensable stream. The controller 114 may control the concentrated purge stream 120 to a temperature selected for safe handling (e.g. 140 degrees F.), and/or for other concerns downstream such as the cooling capacity of a waste handling system (not shown).

The pre-recovery concentrated purge stream 124 may be controlled to 230-240 degrees F., and this temperature may be selected according to the specifications of the primary heat exchanger 136 and/or the secondary recovery heat exchanger 123. The circulation pump 128 may operate at about 2-15 psig on the suction side (pre-heated feed stream 122) and 25-55 psig on the discharge side (circulation stream 132).

The controller 114 may control the amount of the pre-recovery concentrated purge stream 124 to keep the desired concentration in the concentrated purge stream 120. For example, the waste fluid stream 104 may include 1,000 ppm impurities, and the controller 114 may control the pre-recovery concentrated purge stream 124 to 50,000 ppm impurities. In the example, at steady state with a waste fluid stream 104 of 100 gpm, the concentrated purge stream 120 would be about 2 gpm, while the purified product stream 149C would be about 98 gpm. The controller 114 may utilize varying concentrations, temperatures, and/or flow targets during transient operations such as system 100 startup, concentration variations in the waste fluid stream 104, and the like.

In one embodiment, the concentration of the concentrated bottoms stream 130, which controls the concentration of the concentrated purge stream 120, may be limited by the solubility of the impurities in water. For example, the upper limit of certain salt concentrations may be 200,000 to 800,000 ppm or greater according to the solubility limit of the particular salt. The type of impurity and the concentration of the pre-recovery concentrated purge stream 124 depend upon the application of the system 100. The final concentration of the pre-recovery concentrated purge stream 124 may be limited by the pumpability of the pre-recovery concentrated purge stream 124, and therefore any concentration up to saturation and even a little beyond (e.g. if solids are present but in a pumpable suspension) may be utilized depending upon the application.

In one embodiment, the concentration of the concentrated bottoms stream 130 may be selected according to the utilization of the concentrated purge stream 120 as an intended product. For example, the concentrated purge stream 120 may be utilized as a 42% NaCl solution, and the controller 114 may control the concentration of the concentrated bottoms stream 130 such that the concentrated purge stream 120 exits the system 100 as a 42% NaCl solution. In one aspect of the technology, the concentrated purge stream 120 is directed to a dewatering device. Non-limiting examples of dewatering devices include belt-press filters, rotary screw filters, drying beds, furnaces, coagulation and flocculation tanks, centrifuge, or other processes known in the art resulting in a solid or semi-solid waste product and waste water. The "dewatered" solids are disposed in a conventional land fill while water removed from the concentrated purge stream 120 is recycled into the system 100 for processing. The end result is a zero liquid discharge system minimizing residual liquid disposal costs and associated potential environmental concerns.

In one aspect, the boiling point in the circulation loop (i.e. through the circulation pump 128, the primary heat exchanger 136, and the evaporation unit 141) can be raised through concentration to precipitate most salts into a circulated 5-10% by weight slurry. This typically occurs around 420,000 mg/l for NaCl salts. The salt slurry (i.e., the concentrated bottoms stream 130 and/or the circulation stream 132) is automatically purged from the system 100 to maintain maximum concentration in the circulation loop. This is controlled by the differential pressure across the blower 142, as blower discharge pressure equates to blower discharge temperature. The higher the level of salts in the circulation loop, the higher the temperature that is required to condense the pressurized distillate stream 146 as heat is transferred into the circulation loop via the primary heat exchanger 136. Preserving the heat transfer characteristics of the primary heat exchanger 136 can therefore facilitate proper operation of the system 100. In particular, the free flow configuration of the primary heat exchanger 136, which eliminates or minimizes fouling by solids, and the backpressure maintained on the primary heat exchanger 136, which prevents scaling due to vapor formation, preserves the heat transfer characteristics of the primary heat exchanger 136.

In one embodiment, the controller 114 is configured to operate the system 100 at a pressure slightly higher than atmospheric pressure. For example, the blower 142 may run at 2-4 psig on the suction side and 12-18 psig at the discharge side nominally, and the controller 114 may increase the pressure to 10 psig and 20 psig respectively under some conditions. Other pressures in the system 100 may likewise be increased, for example the pressures in the evaporation unit 141 or an optional stripping vessel that may be used to remove volatile organics. In one embodiment, the capacity of the system 100 in terms of the waste fluid stream 104 mass that can be accepted increases by about 5% for each one psi increase of the system 100 pressure. Therefore, the controller 114 can configure the system 100 capacity to a requirement of an application and/or for other reasons. For example, applications may include multiple purification systems 100, and one or more of the systems 100 may be shut down for maintenance. In the example, the controller 114 may increase the operating pressure for on-line systems 100 during the maintenance shutdown. Other uses of a configurable waste fluid stream 104 capacity are understood by one of skill in the art and contemplated within the scope of the present invention.

In one embodiment, the system 100 further includes an additives unit 182 that allows additives to be mixed into the circulation stream 132. The location of the additives unit 182 in FIG. 1 is for example only, and the additives unit 182 may be placed anywhere in the circulation from the concentrated bottoms stream 130 to the heated circulation stream 134. The system 100 may further include an additives pump 184 that delivers additives to the additives unit 182. Additives may include anti-foaming agents, anti-corrosion agents, and/or another type of additive that may be beneficial for a given embodiment of the system 100.

In a related example, a method for cleaning a waste fluid stream in accordance with the principles herein is disclosed. The method can comprise pumping a circulation stream including at least one of a waste fluid and a concentrated bottoms stream through a primary heat exchanger. The method can also comprise transferring heat, via a plurality of heat exchange plates in the primary heat exchanger, from a pressurized distillate stream to the circulation stream to form a heated circulation stream, wherein the plurality of heat exchange plates are spaced to facilitate free flow of solids in the circulation stream between the plurality of heat exchange plates, and wherein a mass flow rate of the circulation stream is configured to minimize build-up of solids in the primary heat exchanger. Additionally, the method can comprise evaporating volatile compounds from the heated circulation stream in the evaporation unit to form a distillate stream and passing the distillate stream through a compressor to form the pressurized distillate stream, wherein the concentrated bottoms stream comprises a portion of the heated circulation stream that does not evaporate in the evaporation unit.

It is noted that no specific order is required in these methods unless required by the claims set forth herein, though generally in some embodiments, the method steps can be carried out sequentially.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An aqueous stream cleaning system, comprising:
a waste fluid pump in fluid communication with a waste fluid source and configured to expel a waste fluid stream;
a circulation pump configured to receive an aqueous stream comprising at least one of the waste fluid stream and a concentrated bottoms stream, and expel a circulation stream;
a primary heat exchanger configured to receive the circulation stream from the circulation pump, said primary heat exchanger having a plurality of heat exchange members that define an internal surface area for heat transfer from a pressurized distillate stream to the circulation stream;
an evaporation unit configured to receive a heated circulation stream from the primary heat exchanger, wherein a cooled distillate stream is formed when the heated circulation stream evaporates in the evaporation unit, the concentrated bottoms stream is formed from a portion of the heated circulation stream that does not evaporate;
a compressor to receive the cooled distillate stream from the evaporation unit and expel the pressurized distillate stream to the primary heat exchanger, after which the primary heat exchanger condenses the pressurized distillate stream into a purified aqueous stream;
a recirculation loop in fluid communication with the circulation pump and the waste fluid stream with an inlet from the waste fluid stream prior to the circulation pump configured to form a recirculation stream, wherein a ratio of the mass flow rate of the recirculation stream within the recirculation loop to the mass flow rate of the waste fluid stream received by the circulation pump is greater than about 4; and
a secondary heat exchanger in fluid communication with the cooled distillate stream, said secondary heat exchanger operative to heat the recirculation stream, wherein either:
the recirculation loop rejoins the waste fluid stream at the secondary heat exchanger, or
the recirculation loop is configured to selectively rejoin the waste fluid stream at the waste fluid source and at the secondary heat exchanger.

2. The aqueous stream cleaning system of claim 1, wherein a ratio of the mass flow rate of the recirculation stream within the recirculation loop to the mass flow rate of the waste stream received by the circulation pump ranges from greater than about 4 to 6.

3. The aqueous stream cleaning system of claim 1, wherein said recirculation loop has an inlet prior to the circulation pump and an outlet at the waste fluid stream.

4. The aqueous stream cleaning system of claim 1, wherein the evaporation unit comprises:
a cylindrical evaporation unit configured with an inlet to receive the heated circulation stream from the primary heat exchanger, wherein said distillate stream is formed when the heated circulation stream evaporates in the cylindrical evaporation unit, and said concentrated bottoms stream is formed from a portion of the heated circulation stream that does not evaporate, said inlet disposed tangentially about the periphery of the cylindrical evaporation unit and angled downward with respect to a sidewall of the cylindrical evaporation unit.

5. The aqueous stream cleaning system of claim 4, further comprising a vortex breaker disposed about the cylindrical evaporation unit proximate to a top of an accumulated concentrated bottoms within the cylindrical evaporation unit.

6. The aqueous stream cleaning system of claim 4, further comprising an adjustable height vortex finder disposed about a top of the cylindrical evaporation unit.

7. The aqueous stream cleaning system of claim 4, further comprising an orifice between the primary heat exchanger and the cylindrical evaporation unit and configured to maintain a backpressure on the primary heat exchanger wherein the orifice comprises a removable orifice valve or plate disposed within a flange about an exterior of the cylindrical evaporation unit.

8. The aqueous stream cleaning system of claim 1, wherein said compressor comprises:
a plurality of seals defining an area between an oil chamber and a steam chamber;
a volume of pressurized fluid propagated from a fluid inlet disposed in fluid communication with the area between the oil chamber and the steam chamber into the area between the oil chamber and the steam chamber, a pressure of the volume of pressurized fluid being greater than a pressure within the steam chamber; and a fluid outlet disposed within the area between the oil chamber and the steam chamber.

9. The aqueous stream cleaning system of claim 8, wherein the volume of pressurized fluid is pressurized at between 5 and 15 pounds per square inch.

10. The aqueous stream cleaning system of claim 8, wherein the volume of pressurized fluid is communicated away from the area by the fluid outlet.

11. The aqueous stream cleaning system of claim 1, wherein the circulation pump is operable to produce a mass flow rate of the circulation stream to the mass flow rate of the distillate stream in a ratio of greater than about 250.

12. The aqueous stream cleaning system of claim 11, wherein a ratio of the mass flow rate of the circulation stream to the mass flow rate of the distillate stream ranges from greater than about 300 to 500.

13. The aqueous stream cleaning system of claim 1, wherein the plurality of heat exchange members are substantially flat and are spaced at least 5 mm from one another.

14. The aqueous stream cleaning system of claim 13, wherein the plurality of heat exchange members are spaced from one another between about at least 6 mm to 12 mm and wherein the plurality of heat exchange members have a thickness of at least about 0.8-0.9 mm.

15. The aqueous stream cleaning system of claim 1, wherein the heat exchange members are placed within the heat exchanger such that no portion of an individual heat exchange member is in contact with an adjacent heat exchange member.

16. The aqueous stream cleaning system of claim 1, wherein the velocity of the circulation stream through inlet ports of the heat exchanger is less than about 20 feet per second.

17. The aqueous stream cleaning system of claim 1, further comprising a source of make-up steam in fluid communication with the primary heat exchanger.

18. The aqueous stream cleaning system of claim 17, wherein the primary heat exchanger is divided into two sections to transfer heat to the circulation stream, a first heat donating section in fluid communication with the pressurized distillate stream and a second heat donating section in fluid communication with the make-up steam.

19. The aqueous stream cleaning system of claim 18, wherein the first section comprises about 75-85 percent of the total heat donating surface area to transfer heat to the circulation stream and the second section comprises about 15-25 percent of the total heat donating surface area to transfer heat to the circulation stream.

20. The aqueous stream cleaning system of claim 1, further comprising an inducer disposed prior to a circulation pump inlet extending into inlet piping of the circulation pump, said inducer creating a rotational direction of flow of the waste fluid prior to being received by the circulation pump.

* * * * *